(12) United States Patent
Schlimmer et al.

(10) Patent No.: US 7,801,999 B2
(45) Date of Patent: Sep. 21, 2010

(54) BINDING HETEROGENEOUS TRANSPORTS TO A MESSAGE CONTRACT

(75) Inventors: Jeffrey C. Schlimmer, Redmond, WA (US); David E. Langworthy, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1471 days.

(21) Appl. No.: 11/010,999

(22) Filed: Dec. 13, 2004

(65) Prior Publication Data

US 2006/0129655 A1 Jun. 15, 2006

(51) Int. Cl.
*G06F 15/16* (2006.01)
*G06F 17/00* (2006.01)

(52) U.S. Cl. .................. 709/228; 709/236; 715/234
(58) Field of Classification Search .............. 709/228, 709/236; 715/234
See application file for complete search history.

(56) References Cited

U.S. PATENT DOCUMENTS

2005/0262188 A1* 11/2005 Mamou et al. ............... 709/203

OTHER PUBLICATIONS

Christensen, et al., *Web Services Description Language (WSDL) 1.1*, W3C Note, Mar. 15, 2001, pp. 1-51, available at http://www.w3.org/TR/wsdl.

Schlimmer, et al., *Expressing Requirements and Capabilities for Web Services*, Sep. 1, 2004, pp. 1-9, available at http://www.w3.org/2004/08/ws-cc/jsklms-20040903.
Cerami, Ethan, *Distributed Applications with XML-RPC, SOAP, UDDI & WSDL*, Web services Essentials, Feb. 2002, ch. 6, pp. 1-32, available at http://www.oreilly.com/catalog/webservess/chapter/ch06.html.
Shi, Xuan, *Semantic Request and Response for Standardized Web Services*, Nov. 11, 2004, pp. 1-13, available at http://www-128.ibm.com/developerworks/library/ws-semantic/?ca=drs-ws4704.
Tapang, Carlos, C., *Web Services Description Language (WSDL) Explained*, Jul. 2001, pp. 1-34, available at http://msdn.microsoft.com/archive/en-us/dnarxml/html/wsdlexplained.asp?frame=true.
PerfectXML, *Focus Web Services WSDL, UDDI, DISCO, & more*, pp. 1-7, available at http://www.perfectxml.com/WebSvc3.asp.

* cited by examiner

*Primary Examiner*—Vivek Srivastava
*Assistant Examiner*—Tanim Hossain
(74) *Attorney, Agent, or Firm*—Workman Nydegger

(57) ABSTRACT

Example embodiments provide for a new set of binding extensions that allow individual messages within a contract of a Network Protocol Description Language data structure (e.g., a portType of a WSDL document or file) to flow over different transports and to different network transport addresses. Further, example embodiments provide for a concise expression of protocol choices through the use of a default element for specifying one of a plurality of binding mechanisms. Moreover, the present invention also provides for not only defining services within a document or data structure through standard URLs, but also for allowing the addressing of a service using an endpoint reference as defined by, e.g., WS-Addressing. This allows for a more robust way to address a service in a document by providing a lightweight, extensible, self-contained description of the service.

39 Claims, 6 Drawing Sheets

```xml
<?xml version="1.0" encoding="UTF-8"?>
<definitions xmlns="http://schemas.xmlsoap.org/wsdl/"
        xmlns:xs="http://www.w3.org/2001/XMLSchema"
        xmlns:tns="http://example.com/calc" targetNamespace="http://example.com/calc" >
    <types>
        <xs:schema targetNamespace="http://example.com/calc" >
            <xs:element name="Add" type="tns:NumberPair" />
            <xs:element name="AddResult" type="xs:integer" />
            <xs:element name="ExcResult" type="tns:NumberPair" />
            <xs:complexType name="NumberPair" >
                <xs:sequence>
                    <xs:element name="A" type="xs:integer" />
                    <xs:element name="B" type="xs:integer" />
                </xs:sequence>
            </xs:complexType>
        </xs:schema>
    </types>
    <message name="AddMsg" >
        <part name="Body" element="tns:Add" />
    </message>
    <message name="AddResultMsg" >
        <part name="Body" element="tns:AddResult" />
    </message>
    <message name="ExcMsg" />
    <message name="ExcResultMsg" >
        <part name="Body" element="tns:ExcResult" />
    </message>
```

*Fig. 2A*

```
<portType name="CalcPortType" >
   <operation name="AddOp" >
      <input message="tns:AddMsg" />
      <output message="tns:AddResultMsg" />
   </operation>
   <operation name="ExcOp" >
      <input message="tns:ExcMsg" />
      <output message="tns:ExcResultMsg" />
   </operation>
</portType>
<binding name="ExampleBinding" type="tns:CalcPortType"
                              xmlns:abc="http://schemas.microsoft.com/wsdl/soap/" >
   <abc:binding style="document"
      defaultTransports="http://schemas.xmlsoap.org/soap/udp
                         http://schemas.xmlsoap.org/soap/http" />
   <operation name="AddOp" >
      <abc:operation soapAction="http://example.com/Calc/Add" />
      <input>
         <abc:body use="literal"
                  transports="http://example.org/soap/sms/
                              http://example.org/soap/email/" />
      </input>
      <output>
         <abc:body use="literal" />
      </output>
   </operation>
   <operation name="ExcOp" >
      <abc:operation soapAction="http://example.com/Calc/Exc" />
      <input>
         <abc:body use="literal" transports="http://schemas.xmlsoap.org/soap/http"/>
      </input>
      <output>
         <abc:body use="literal" transports="http://schemas.xmlsoap.org/soap/http"/>
      </output>
   </operation>
</binding>
<service name="CalcService" >
   <port name="PortA" binding="tns:ExampleBinding"
                              xmlns:abc="http://schemas.microsoft.com/wsdl/soap/" >
      <abc:address
         locations="mailto:calc.cgi@svc1.example.com
                    sms:123-456-7890
                    http://svc1.example.com/calc.cgi />
   </port>
</service>
</definitions>
```

Fig. 2B

```
<?xml version="1.0" encoding ="UTF-8"?>
<definitions ...>
    ...
    <service>
        <service name=CalcService">
        <port name="PortA" binding="tns:SoapHttpBinding"
              xmlns:abc="http://schemas.microsoft.com/wsdl/soap/" >
            <abc:address >
                <wsa:EndpointReference
                    xmlns:wsa="http://schemas.xmlsoap.org/ws/2004/08/addressing" >
                    <wsa:Address>
                        uuid:823ebf00-2ca0-11d9-9669-0800200c9a66
                    </wsa:Address>
                    <wsa:ReferenceProperties>
                        <x:ServiceName xmlns:x="http://schemas.example.com/" >
                            Calc.cgi
                        </x:ServiceName>
                    </wsa:ReferneceProperties>
                </wsa:EndpointReference>
                <wsd:XAddrs xmlns:wsd="http://schemas.xmlsoap.org/ws/2004/09/discovery" >
                    mailto:svc1@example.com
                </wsd:Addrs>
            </abc:address>
        </port>
    </service>
    ...
</definitions>
```

- 245: wsa:EndpointReference block
- 250: wsd:XAddrs block

*Fig. 2C*

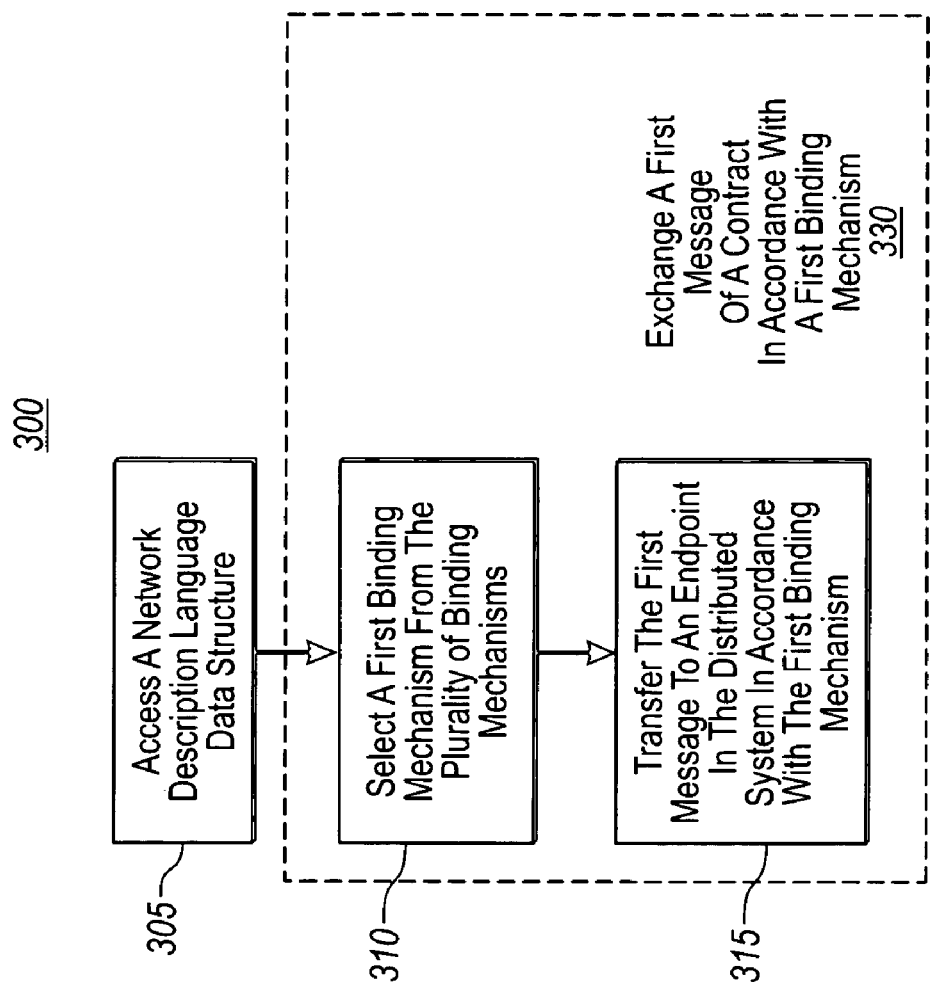

BINDING HETEROGENEOUS TRANSPORTS TO A MESSAGE CONTRACT

CROSS-REFERENCE TO RELATED APPLICATIONS

N/A

BACKGROUND OF THE INVENTION

1. The Field of the Invention

The present invention generally relates to network description language contracts, e.g., Web Services Description Language (WSDL). More particularly, the present invention provides for extending such Network Protocol Description Languages by enabling each message within the same contract to be bound to a plurality of different binding mechanisms.

2. Background and Related Art

Computer systems and related technology affect many aspects of society. Indeed, the computer system's ability to process information has transformed the way we live and work. Computer systems now commonly perform a host of tasks (e.g., word processing, scheduling, database management, etc.) that prior to the advent of computer systems were performed manually. More recently, computer systems have been coupled to one another to form computer networks over which the computer systems can communicate electronically to share data. Web Services has been a driving force in advancing such communications between computer systems and is turning the way we build and use software inside-out.

Web Services let applications share data, and—more powerfully—invoke capabilities from other applications without regard to how those applications were built, what operating system or platform they run on, and what devices are used to access them. Web Services are invoked over the Internet by means of industry-standard protocols including SOAP (Simple Open Access Protocol), XML (extensible Markup Language), UDDI (Universal Description Discovery Integration), WSDL (Web Service Description Language), etc. Although Web Services remain independent of each other, they can loosely link themselves into a collaborating group that performs a particular task.

Often, electronic communication on a Web Service network includes a client computer system (hereafter referred to as a "client") requesting access to a network service (e.g., Web Services) at a server computer system (hereinafter referred to as a "service"). Accordingly, the client sends a request to the service for particular access to its system resources, wherein if the client is authorized and validated, the service responds with a response message providing the desired information. Of course, other messaging patterns between client and service are available and include simple singleton messages as well as more sophisticated multi-message exchanges like, e.g., notifications, solicit-response, pub-sub patterns, polling, kick-push, queuing and others. Further, these types of communication are governed by various requirements and capabilities defined by both the client and the service in contracts for distributed systems (e.g., Web Services).

A contract is an expression of visible aspects of a service behavior. A contract is represented by a mixture of machine-readable languages and human language. Besides the obvious opportunity for additional precision, machine-readable languages enable tooling to construct partial service implementations, automate service deployment, audit/validate messages exchanged, manage services, and enable a host of other network-related functions. Due, however, to limitations in the expressive power of machine-readable languages, human languages remain an important component of contracts—principally to describe message and message exchange pattern semantics.

Network Protocol Description Languages (e.g., WSDL) provide an overall wrapper or specification for describing contracts (e.g., WS contracts) in a common or standard language. Such specifications make it easy for developers and developer tools to create and interpret contracts. Although such Network Protocol Description Languages (hereinafter referred to as "NPDL") have extensive tooling suites, which in large part accounts for their popularity, there are currently several shortcomings and downfalls to such specifications. For example, current Network Protocol Description Languages bind a contract to a single protocol or binding mechanism which describes how to encapsulate or format the message (e.g., SOAP envelope) and what transport to use for exchanging the message with a service (e.g., HTTP (Hyper-Text Transport Protocol), FTP (File Transfer Protocol), SMTP (Simple Message Transfer Protocol), TCP (Transmission Control Protocol), UDP (User Datagram Protocol), SMS (Short Message Service), SNA (Systems Network Architecture), GPRS (General Packet Radio Service), etc.).

Although some NPDLs allow for multiple bindings for a single contract, they do not allow for multiple binding mechanisms for the same binding, nor do they allow for different binding mechanisms for individual messages within the same contract. Accordingly, once a binding is chosen for a contract, each message defined by that contract is bound to the same binding mechanism described within the chosen binding. This unnecessary constraint on contracts limits the type of interactions for the message exchange patterns (MEPs) between a client and a service, and does not take full advantage of the unique characteristics provided by different binding mechanisms (i.e., different message formatting and/or different transports).

In addition, this model of binding a contract to a single binding mechanism does not accurately reflect the state of messaging systems, wherein one message in an exchange is carried over one transport whilst another message in the same exchange is carried over another. For example, multiple transports are commonly used because of differing network characteristics or requirements. Such is the case when a mobile service sends an SMS message to a mobile client, and in response the mobile client opens a TCP connection to the mobile service and sends a SOAP message back. Further, there are transports having unique capabilities that often times should be leveraged for different messages defined within the same contract. For instance, UDP is limited in size but allows for quick communication, whereas HTTP allows for larger data transfer and can go through a firewall one-way but not the other. Of course the many transports and/or binding mechanisms each have their own advantageous characteristics. Accordingly, one can easily imagine the desire for sending one or more messages within the same contract—and even for sending one or more messages within the same MEP—over separate transports to leverage their unique features.

Another drawback of current NPDLs is the rigid nature for addressing a service. Currently, addresses for a service are defined by standard URIs, e.g., a URL, which points to a specific web address. There are, however, instances where it may be desirable to express a service in a transport-neutral and self-contained way. For example, in the case of a typical URL, if the device doesn't support HTTP, then the device cannot get access without going through some other intermediary or proxy. This creates a problem for one of the fundamental purposes of Web Services, which is to provide services to a multitude of devices in an environment agnostic way.

Accordingly, there exists a need to be able to extend Network Protocol Description Languages to take full advantage of the various unique binding mechanisms available. Further, there is also a need for extending the addressing within a Network Protocol Description Language such that a service may be defined by URLs as well as a transport-neutral description of the service.

BRIEF SUMMARY OF THE INVENTION

The above-identified deficiencies and drawbacks of current Network Protocol Description Languages are overcome by exemplary embodiments of the present invention. For example, the present invention provides for extending the Network Protocol Description Language (NPDL) by enabling individual messages within the contract to be bound to a plurality of different binding mechanisms in order to exploit their unique characteristics.

For example, a NPDL data structure may be accessed that comprises a contract that outlines at least one message exchange pattern and at least one binding that comprises a plurality of binding mechanisms, each of which describe a specific data format and/or a specific transport to use in exchanging messages with a service. Thereafter, a first binding mechanism from the plurality of binding mechanisms is selected for exchanging a first message of the at least one message exchange pattern between endpoints within a distributed system, wherein one of the endpoints includes the service. The first message is then transferred to one of the endpoints in the distributed system in accordance with the first binding mechanism and the message exchange pattern.

Other exemplary embodiments provide for a Network Protocol Description Language (NPDL) data structure comprising a contract field storing a plurality of contract values that describe at least one message exchange pattern for exchanging one or more messages with a service. The NPDL data structure further comprises a binding field with a plurality of binding mechanisms. Each binding mechanism storing a binding value that describes how the one or more messages are to be formatted and transported when being exchanged between the service and an endpoint of a distributed system in accordance with the message exchange pattern. The NPDL data structure also comprises one or more service fields storing one or more address values that define at least one address for the service corresponding to one or more of the plurality of binding mechanisms.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 2A and 2B illustrate an example WSDL file that binds individual messages within the same portType to a plurality of binding mechanisms in accordance with exemplary embodiments of the present invention;

FIG. 2C illustrates an example extension of a WSDL document that references a service through a standard URL and an endpoint reference in accordance with exemplary embodiments of the present invention;

FIG. 3 illustrates a flow diagram of a method for extending a Network Protocol Description Language enabling individual messages within the contract to be bound to a plurality of different binding mechanisms in accordance with example embodiments of the present invention;

DETAILED DESCRIPTION OF THE PREFERRED EMBODIMENTS

The present invention extends to methods, systems and computer program products for extending a Network Protocol Description Language by binding individual messages within a contract to a plurality of binding mechanisms. The embodiments of the present invention may comprise a special purpose or general-purpose computer including various computer hardware, as discussed in greater detail below.

Example embodiments provide for a new set of binding extensions that allow individual messages within a contract of a Network Protocol Description Language data structure (e.g., a portType of a WSDL document or file) to flow over different, e.g., transports and to different network transport addresses. Further, example embodiments provide for a concise expression of protocol choices through the use of a default mechanism. Moreover, the present invention also provides for not only defining services within a document or data structure through standard URLs, but also for allowing the addressing of a service using an endpoint reference as defined by, e.g., WS-Addressing. This allows for a more robust way to address a service in a document by providing a lightweight, extensible, self-contained description of the service.

Figure 1:
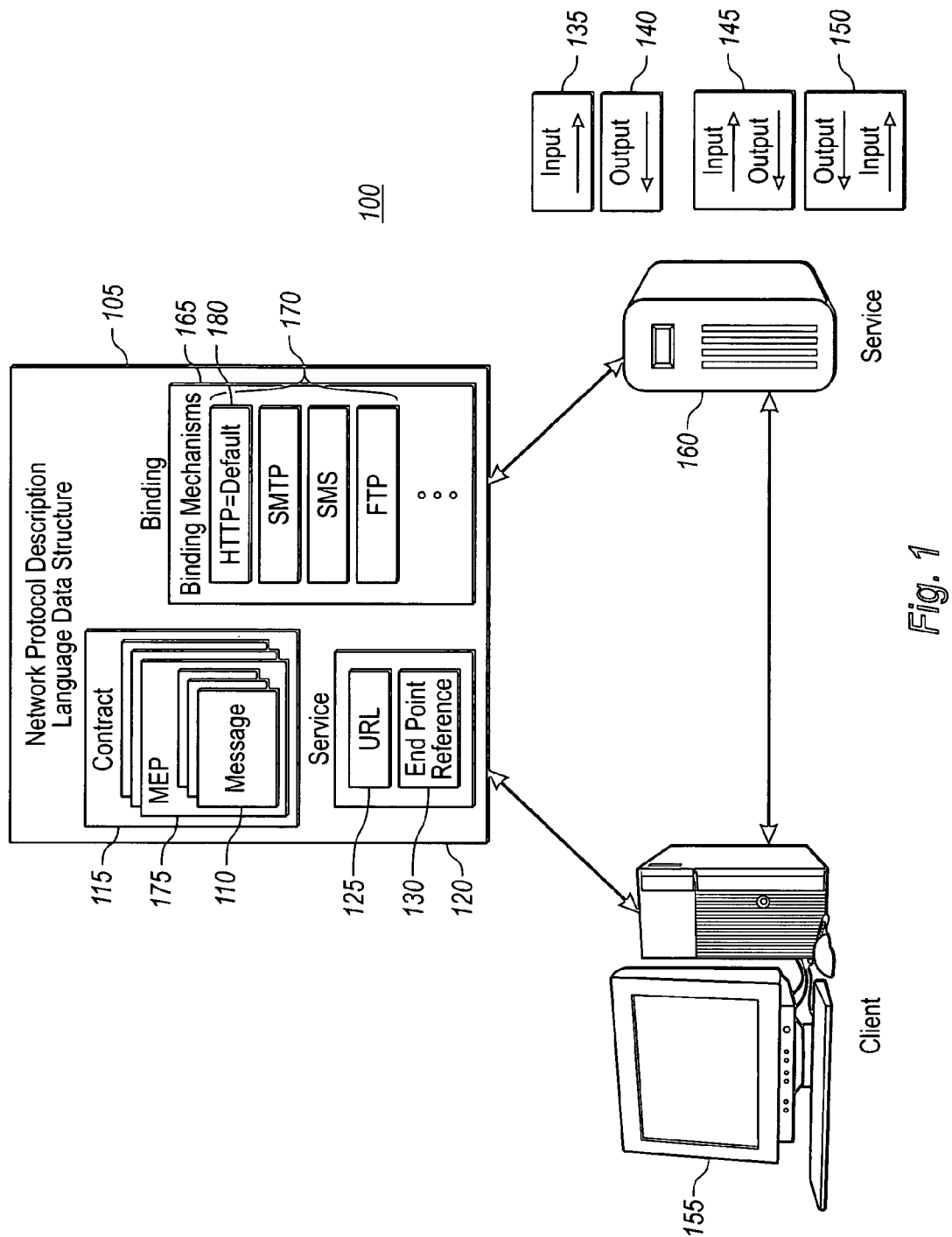
FIG. 1 illustrates an extended Network Protocol Description Language data structure used for exchanging messages in a distributed system in accordance with example embodiments of the present invention.

FIG. 1 illustrates a distributed system 100 with a Network Protocol Description Language data structure 105 that has been extended in accordance with example embodiments. Network Protocol Description Language (NPDL) data structure 105 (e.g., a WSDL document), may include several elements or definitions including contract element 115, message exchange patterns 175, messages elements 110, service element 120 and binding element 165. As described in greater detail below, the contract element 115 defines one or more message exchange patterns 175 for messages defined in the message element 110. Typically, message element 110 describes a one-way message, whether it is a single message request or a single message response. Further, message element 110 defines the name of the message and contains zero or more message part elements, which can refer to message parameters or message return values.

In the event that the NPDL data structure is a WSDL document, the contract is defined by portType element that combines one or more MEPs 175 (commonly referred to as "operations") for aggregating message elements 110 to form a complete one-way or round-trip operation. For example, an MEP 175 can combine one request and one response message into a single request/response operation, most commonly used in SOAP services. Note that a portType can (and frequently does) define multiple operations elements for a multitude of message elements 110.

Further note that a generic contract 110 defines MEPs 175 for rich message exchange sets. For example, a WSDL port-Type defines operations for a single input 135, a single output 140, a single input followed by an output 145 or alternatively an output followed by an input 150. Messages of direction "input" are typically sent to a network transport address defined in the service element 120, whereas messages of direction "output" are typically sent to a network address implied by the underlining transport on which the corresponding message of direction "input" was received, e.g., a HTTP request/response. Note that although the above example uses inputs and outputs for describing MEPs 175 in a WSDL environment, other MEPs (e.g., notifications, solicit-response, pub-sub patterns, polling, kick-push, queuing, etc.) are also available to the present invention. Accordingly, any specific use of an MEP 175 in describing embodiments of the present invention is used for illustrative purposes on only and is not meant to limit or otherwise narrow the scope of the present invention unless explicitly claimed.

Exemplary embodiments provide that the binding element 165 includes binding mechanisms 170 that describe the specifics of how the service will be implemented on the wire (or through the air as the case may be), i.e., how the message will be exchanged between a client 155 and service 160 through formatting (e.g., SOAP encapsulation) and/or transport protocol details (HTTP, FTP, SMS, SMTP, UDP, TCP/IP, SNA, GPRS, etc.). Typical, as noted above, Network Protocol Description Languages (e.g., WSDL) only allow for a single binding mechanism for all of the messages elements 110 within the same contract 115. Exemplary embodiments, however, extend the binding element 165 by providing extensions for defining a multitude of binding mechanisms 170 within a single binding element 165. As such, individual message element 110 for the same contract 115 can be serialized and transported between endpoints 155, 160 using different binding mechanisms. In fact, individual messages 110 correlated by a MEP 175 can be sent using different binding mechanisms 175. By allowing individual messages for a contract 115 between endpoints 155, 160 in the distributed system 100 to communicate over different binding mechanism 170, this extension enables one to exploit the advantageous or unique characteristics of each binding mechanism 170 defined.

Note that each "input" message defined by the contract 115 needs a corresponding service element 120 that matches the particular binding mechanism 170 used. For example, if an "input" message for contract 115 is bound to HTTP and/or SMTP, then the service element 120 needs to have a corresponding HTTP and/or SMTP address listed.

Because the current state of the art binds all the messages 110 for the same contract 115 to a single binding mechanism 170, messages of direction "output" are always sent to the network transport address implied by the underlying transport on which the corresponding message of direction "input" was received (e.g., an HTTP response). Example embodiments, however, provide that messages of direction "output" may be sent to the client 155 (or elsewhere) based on a network transport address contained in, e.g., a header field of the "input" message. For example, an "output" message may be sent to an address listed in a reply to field (e.g., wsa: ReplyTo for WS-Addressing) of a SOAP header block for the corresponding "input" message. Note that because the "reply to" header field of the message may indicate any transport or binding mechanism 170 for a response, it may be used in message exchange patterns that are not readily described in current Network Protocol Description Languages, e.g., WSDL.

Nevertheless, the service 160 needs to support the prescribed binding mechanism 170 for sending "output" messages (as outlined in the header field of the "input" message), otherwise a failure occurs. Accordingly, other embodiments provide for a negotiation between the client 155 and service 160 to determine the needs and support of each device in order to efficiently communicate. In other words, in order to preserve valuable system resources, the client 155 and service 160 should exchange information about each others' capabilities prior to initiating the communication session.

In an alternative embodiment, messages of direction "output" may be sent to a pre-arranged address. For example, when a subscription has been established as defined by WS-Eventing, notifications may be sent to the defined address within the WS-Eventing document. Of course, other pre-defined addresses and well known mechanisms for making and sending messages to a prearranged address are also available to the present invention. Accordingly, the specific example for WS-Eventing given above is used for illustrative purposes only and is not meant to limit or otherwise narrow the scope of the present invention unless explicitly claimed.

Note that although the binding mechanisms 170 shown in binding element 165 list only transports protocols, binding mechanisms 170 also typically describe the formatting or encapsulation (e.g., SOAP encapsulation) of the message elements 110 as well. Further note, however, that the binding mechanisms 170 do not necessarily need to describe both the formatting and the transport used for exchanging messages between endpoints 155 and 160. For example, the formatting of the message elements 110 may be assumed and the binding mechanisms 170 would therefore only need to specify the particular transport to use. Accordingly, the binding mechanism 170 as defined herein should be broadly construed to include formatting and/or transport type for exchanging message elements 110, unless otherwise explicitly claimed.

Other example embodiments provide for a default binding mechanism 180, which may be a specific binding mechanism 180 used for all message elements 110 unless explicitly overridden for a given message element 110. In the example shown in FIG. 1, the default binding mechanism 180 is an HTTP transport protocol wherein SOAP messages can be transferred over an HTTP transport. Note, however, that other default bindings 180 are available to the present invention. Further note, that the description of the present invention describes or references several different binding mechanisms 170. The list of bindings, however, is not all inclusive (as indicated by the vertical ellipses); and therefore any other well known binding mechanism 170 for transferring messages not included herein is also available to the present invention. In addition, any specific reference to a particular binding mechanism 170 (including a specific reference to message format and/or transport protocol) is used for illustrative purposes only and is not meant to limit or otherwise narrow the scope of the present invention unless explicitly claimed.

Still other exemplary embodiments provide for extending the service element 120 of a NPDL for addressing the service 160 by more than just a URL 125. In this embodiment, the NPDL document 105 has been extended to include an endpoint reference 130 as defined, e.g., in WS-Addressing. This last embodiment provides for a transport-neutral, lightweight, extensible, self-contained description of the service address 160. Accordingly, the service can be described through such things as WS-Discovery extensions, and also through the extensions of WS-Addressing within a NPDL data structure 105.

FIG. 2A illustrates an example of a first portion of a WSDL file 205 that binds individual messages of a contract to a plurality of different binding mechanisms. In this example file 205, an XML Schema and WSDL elements describe a request-response message exchange pattern that adds two numbers together and another arbitrary request-response operation. As shown in FIG. 2A, the WSDL document 205 includes definitions element 215 that defines such things as name spaces, target name space, and a default name space for all elements without a name space prefix. Further shown, WSDL document 205 includes a types element 220, which describes all of the data types used between the client 155 and the service 160. As shown, type elements 220 "Add" and "AddResult" are defined for adding two integers "A" and "B", and type element 220 "ExcResult" is defined for some arbitrary operation.

Next, WSDL document 205 defines four messages in message element 225. First, message "AddMsg" is defined for requesting the adding of the two integers defined in the types elements 220. Next, message "ResultMsg" will be used to send the response. Similarly, "ExcMsg" will be used for requesting and initiating of an arbitrary operation, whereas "ExcResultMsg" encapsulate the response.

The contract 230 is then defined by the portType element 230 with operations of "AddOp" and "ExcOp". This contract element 230 first indicates that the "input" message to the "AddOp" for the service will be the "AddMsg," wherein the "output" message from the service is the "AddResultMsg" defined above. Similarly, the "input" message for the operation "ExcOp" will be "ExcMsg" and the "output" will be "ExcResultMsg".

Other elements for the example WSDL document 205 are shown in FIG. 2B, note that the extension attributes are bolded and have an identifier name "abc". As shown, the binding element 235 includes several example extensions that allow the messages defined in the contract 230 to be sent across different binding mechanisms. As can be seen within the abc:binding extension 245 is defaultTransports attribute that has a value that indicates two specific message formats and transports used to serialize messages over the wire. In particular, the defaultTransports attribute specifies the use of either SOAP over UDP, or SOAP over HTTP. Note that at least one of these binding mechanisms be implemented for all messages within the portType 230, unless explicitly overridden for a given message. Further note that this default feature enables a concise expression of binding mechanisms since it can be used over-and-over to define the serialization and/or transport for several messages, without having to right a binding mechanism for every message element in the contract.

It should also be noted that default attributes (as well as specific override elements described below) do not necessarily have to specify multiple binding mechanisms. Nevertheless, this extension allows for multiple binding mechanisms (including different message formatting and/or transports) to be available for each message associated with the particular attribute (i.e., default or specific overrides). This embodiment has several advantageous features including, support for system failure, resolving compatibility issues, efficiency purposes, etc. Accordingly, the specific binding mechanism chosen may be based on a myriad of circumstances including not only those listed above but also based on, e.g., the decision made for prior choices.

The abc:operations 250 and 255 defined under both the "AddOp" and "ExcOp," respectively, within the binding element 235 operates in a similar manner as typical operation elements defined by the current WSDL infrastructure. Note, however, several abc:body extensions within the binding operations 250, 255 have transport attributes that overrides the value of the abc:binding/@defaultTransports for various message elements. In particular, note the "input" message for the "AddOp" 250 has specific binding mechanisms that allow "AddMsg" to be sent to the service using SOAP over SMS and/or SOAP over SMTP (i.e., email). The "output" (i.e., "AddResultMsg" for "AddOp" 250, however, will be sent according to the defaultTransports since no Hspecific binding mechanism(s) are listed for this message. Further note that, both the "input" and "output" messages (i.e., "ExcMsg" and "ExcResultMsg," respectively) for the "ExcOp" MEP 255 specifically override the defaultTransport attribute and will be sent using SOAP over HTTP.

As previously mentioned, for all binding mechanisms listed in binding element 235 for input messages defined within the contract 230, there needs to be a corresponding service address for that binding mechanism. Note that in the event that a single "input" message is bound to multiple binding mechanisms, there needs to be multiple addresses in the service element 240 corresponding to each binding mechanism listed. Accordingly, as shown in the in the service element 240 of the WSDL document 205, because the "input" message "AddMsg" is bound to SOAP over SMS and/or email, and because "input" message "ExcMsg" is bound to SOAP over HTTP, a corresponding abc:address extension that includes an SMS, an email and an HTTP address are listed therein.

Similarly note that because the "output" message "AddResultMsg" is bound to SOAP over HTTP or email, the input message "AddMsg" should define an address for sending the response. That is, if the response message "AddResultMsg" is to be sent back to the client 155, an appropriate HTTP address and/or email for the client needs to be included within the input message "AddMsg" (similarly note that the "input" message "ExcMsg" needs to have an HTTP address for sending the "output" message "ExcResultMsg". If an HTTP or email address is not given for the client 155, a fault occurs and the service may raise a fault value to a predetermined address. Alternatively, if a fault occurs, other example embodiments allow a fault message to be sent back to where the message originated. For example, in the case of an email, an error can be sent to the "From:" address within the header of the input message.

FIG. 2C illustrates an excerpt of a WSDL document 210 with extensions for addressing the service by more that just a URL in accordance with example embodiments. As shown, an extension of abc:address 245 defines an endpoint reference as defined by WS-Addressing. This wsa:EndpointReference includes a Universally-Unique Identifier (UUID) with various reference properties for uniquely addressing the service in a transport-neutral, lightweight, extensible, self-contained description. The service may also be addressed using the WS-Discovery extension wsd:XAddrs, which provides a URL to sending the service input messages that are bound to SMTP.

Note that multiple addresses can be defined for a service as alternatives for accessing that service. This maybe used for load balancing purposes and/or for accessing the service through other means when one addressing provides a fault state. Of course, other ways of addressing a service that are commonly known in the industry are also available to the present invention. Accordingly, any reference to a specific way of addressing a service is used for illustrative purposes only and it is not meant to limit or otherwise narrow the scope of the present invention unless explicitly claimed.

The present invention may also be described in terms of methods comprising functional steps and/or non-functional acts. The following is a description of steps and/or acts that may be preformed in practicing the present invention. Usually, functional steps describe the invention in terms of results that are accomplished whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts in the recitation of the claims—and in the following description of the flow chart for FIG. 3—is used to indicate the desired specific use of such terms.

FIG. 3 illustrates a flow chart for various exemplary embodiments of the present invention. The following description of FIG. 3 will occasionally refer to corresponding elements from FIGS. 1, 2A and 2B. Although reference may be made to a specific element from these Figures, such elements are used for illustrative purposes only and are not meant to limit or otherwise narrow the scope of the present invention unless explicitly claimed.

FIG. 3 illustrates an example flow chart of a method 300 of extending a Network Protocol Description Language (NPDL) by enabling individual messages of the contract to be bound to a plurality of different binding mechanisms in order to exploit their unique characteristics. Method 300 includes an act of accessing 305 a Network Protocol Description Language data structure. For example, client 155 (or service 160) may access NPDL data structure 105 that comprises a one contract 115 that outlines at least one message exchange pattern and at least one binding 165. The binding comprises a plurality of binding mechanisms 170, each of which describe specific data format and/or transports to use in exchanging messages with service 160. The network description language data structure conforms to a NPDL (e.g., WSDL) that; gives a framework for describing services in a distributed system 100. Further, the network description language data structure may be an XML document, e.g., WSDL document 205 or 210.

Method 300 includes a step for exchanging 330 a first message of a contract in accordance with a first binding mechanism. More particularly, step 330 includes an act of selecting 310 a first binding mechanism from the plurality of binding mechanisms. For example, client 155 may select a first binding mechanism 180 from the plurality of binding mechanisms 170 for exchanging a first message of the message exchanging pattern between endpoints within a distributed system 100. More particularly, the first binding mechanism selected describes how a first message of the contract 115 is to be formatted and transported between endpoints, e.g., 155, 160 within the distributed system 100. The first binding may be a default value for a concise expression of the transports, which may be used to bind all messages unless explicitly overridden by or for a given message. In the case that the Network Protocol Description Language is WSDL, the contract 115 may be defined by a portType 230 element, which may further include an operation element for the service 160.

Step 330 further includes an act of transferring 315 the first message to an endpoint in the distributed system in accordance with the first binding mechanism. For example, client 155 may send an "input" message to the service 160 formatted in accordance with the first binding mechanism and message exchange pattern. Alternatively, service 160 may send an "output" message to the client 155 or some other endpoint in the distributed system 100 in accordance with the first binding mechanism and the message exchange pattern.

Other example embodiments also provide for selecting a second binding mechanism from the plurality of binding mechanisms. For example, service 160 may select a particular binding mechanism 180 from the plurality of binding mechanisms 170 defined within the binding 165, wherein the second binding mechanism is different from the first binding mechanism in describing how messages for the contract 115 are to be exchanged with the service. The second message may or may not be part of the same message exchange pattern. Next, the second message is transferred accordance with the second binding. For example, service 160 can transfer an "output" message as defined within the NPDL data structure 105 to the client 155 in accordance with the binding mechanism 170 selected. Note that the binding mechanisms may be selected from SOAP over UDP, SOAP over HTTP, SOAP over SMS, SOAP over TCP/IP, SOAP over SMTP, or SOAP over FTP, SOAP over SMS, SOAP over SNA, SOAP over GPRS etc. Further, the binding mechanisms 170 may be selected based on the capabilities of the transport protocols and needs of the endpoints. Further, the binding mechanism 170 may correspond to a plurality of other binding mechanism 170, wherein the binding mechanisms are further chosen based on system failures, efficiency purposes, resolving compatibility issues, or previous choices.

In the event that the first message is an "input" message, exemplary embodiments provide that the "input" message includes addressing information for sending the second message to client 155. Further, other example embodiments provide that the first and second bindings may be selected based on the capabilities of the bindings.

In accordance with other exemplary embodiments, addressing for the service 160 may be in terms of both a URL, which comprises strings for referencing the service across a specific transport of the distributed system 100, and a transport-neutral endpoint reference, which is a lightweight, extensible, self-contained description of the service.

Other exemplary embodiments provide for computer-readable media having stored thereon a NPDL data structure. The NPDL data structure comprising a contract field 115 storing a plurality of contract values that describe message exchange patterns 175 for exchanging messages 110 with a service 160. Further, the NPDL data structure 105 includes a binding field 165 that comprises a plurality of binding mechanisms 170, each binding mechanism 170 storing a binding value that describes how the messages are to be formatted and transported between the service 160 and an endpoint 155 of a distributed system 100 in accordance with MEP 175. Further, the NPDL data structure 105 may include a service field 120 storing address values 125, 130 that define at least one address for the service corresponding to one or more of the plurality of binding mechanisms 170. In addition, the address values may include URL 125 addresses that reference the service 160 over a specific transport on the distributed system 100, and wherein other address values include a transport-neutral endpoint reference 130 for the service 160 that provides a lightweight, extensible, self-contained description of the service 160. For example, endpoint reference may be in XML format and include one or more of a unique user identification, phone number, or port address. Note that other exemplary embodiments defined above also apply to the NPDL data structure in this example embodiment.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise computer storage media or communication media. Computer storage media comprises RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a communication medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 4:
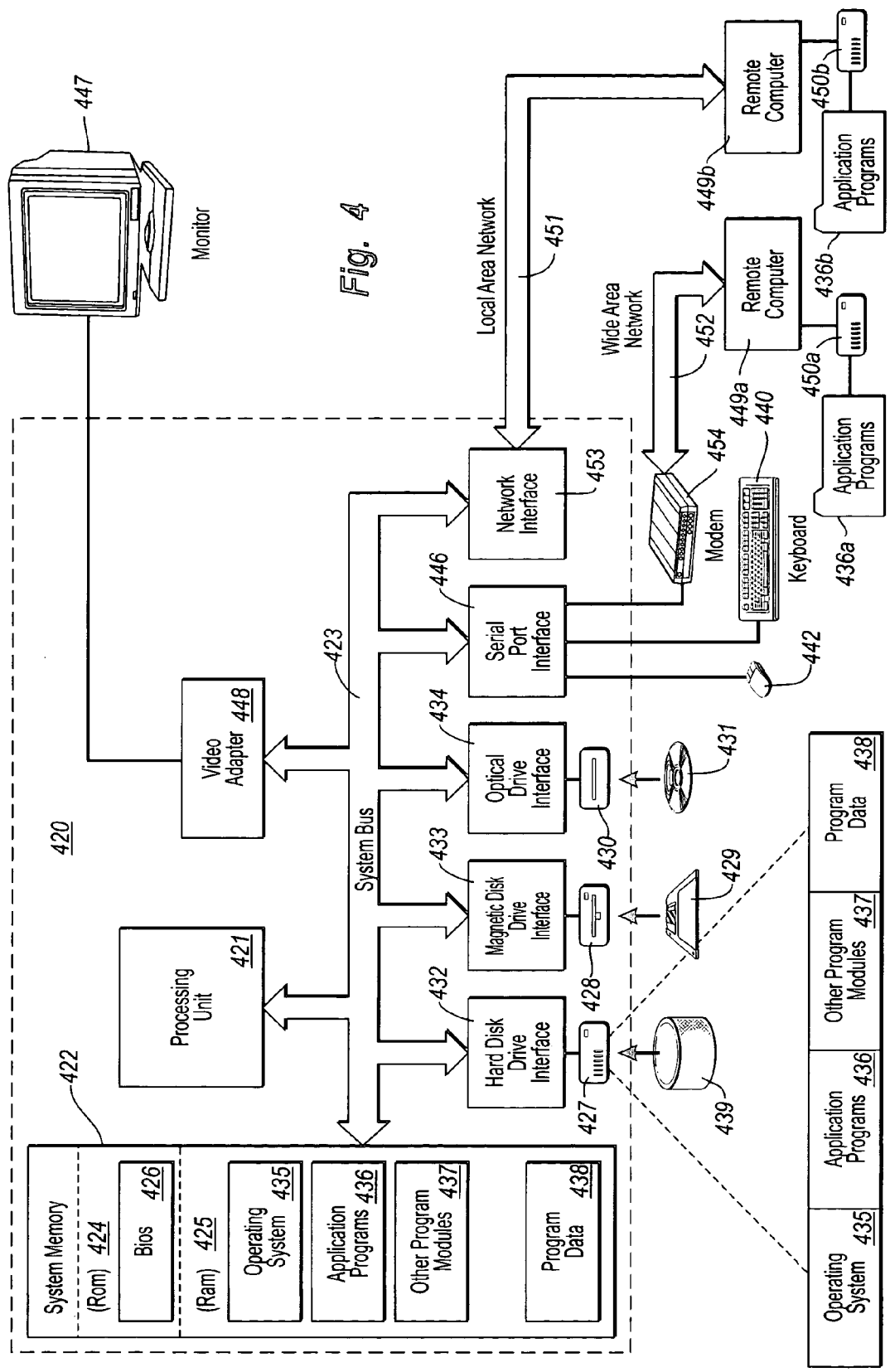
FIG. 4 illustrates an example system that provides a suitable operating environment for the present invention.

FIG. 4 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by and remote processing devices that are linked (either by hardwired links, wireless links, or by a combination of hardwired or wireless links) through a communications network. In a distributed computing environment, program modules may be located in both and remote memory storage devices.

With reference to FIG. 4, an exemplary system for implementing the invention includes a general purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disk drive 430 for reading from or writing to removable optical disk 431 such as a CD-ROM or other optical media. The magnetic hard disk drive 427, magnetic disk drive 428, and optical disk drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 439, magnetic disk 429, optical disk 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 may operate in a networked environment using logical connections to one or more remote computers, such as remote computers 449a and 449b. Remote computers 449a and 449b may each be another personal computer, a server, a router, a network PC, a peer device or other common network node, and typically include many or all of the elements described above relative to the computer 420, although only memory storage devices 450a and 450b and their associated application programs 436a and 436b have been illustrated in FIG. 4. The logical connections depicted in FIG. 4 include a area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computing device in a distributed system that utilizes a Network Protocol Description Language (NPDL) that typically binds messages of a contract to a single binding mechanism, a method of extending the Network Protocol Description Language by enabling individual messages of the contract to be bound to a plurality of different binding mechanisms in order to exploit their unique characteristics, the method comprising acts of:

accessing a NPDL data structure that comprises a contract that outlines at least one message exchange pattern and at least one binding that comprises a plurality of binding mechanisms, each of which describe one or more of a specific data format or a specific transport to use in exchanging messages with a service;

selecting a first binding mechanism from the plurality of binding mechanisms for exchanging a first message of the at least one message exchange pattern between endpoints within a distributed system, wherein one of the endpoints includes the service;

transferring the first message to at least one of the endpoints in the distributed system in accordance with the first binding mechanism and the at least one message exchange pattern;

selecting a second binding mechanism from the plurality of binding mechanisms for exchanging a second message of the at least one message exchange pattern between the endpoints, the second binding mechanism being different from the first binding mechanism; and transferring the second message to at least one of the endpoints in the distributed system in accordance with the second binding mechanism and the at least one message exchange pattern.

2. The method of claim 1, further comprising the acts of:

selecting a second binding mechanism from the plurality of binding mechanism, the second binding mechanism different from the first binding mechanism in describing how messages for the contract are to be exchanged with the service; and transferring a second message in accordance with the second binding.

3. The method of claim 2, wherein the second message is part of the at least one message exchange pattern.

4. The method of claim 2, wherein the first binding is a default binding.

5. The method of claim 2, wherein the first and second bindings are selected based on capabilities of the bindings.

6. The method of claim 2, wherein the first and second bindings are selected from the group comprising SOAP over UDP, SOAP over HTTP, SOAP over TCP/IP, SOAP over SMTP, SOAP over FTP, SOAP over SNA, SOAP over GPRS or SOAP SMS.

7. The method of claim 1, wherein the NPDL is WSDL and wherein the NPDL data structure is an XML document.

8. The method of claim 7, wherein the contract is defined by a portType element.

9. The method of claim 8, wherein the portType element further comprises an operation element for the service.

10. The method of claim 1, wherein the first binding mechanism corresponds to a plurality of other binding mechanisms that can be chosen based on one or more of system failures, efficiency purposes, resolving compatibility issues, or previous choices.

11. The method of claim 1, wherein the first message is an input message to the service and includes addressing information for sending the second message to a client.

12. The method of claim 1, wherein addressing for the service is in terms of both a URL, which comprises strings for referencing the service across a specific transport of the distribute system, and a transport-neutral endpoint reference, which is a lightweight, extensible, self-contained description of the service.

13. At a computing device in a distributed system that utilizes a Network Protocol Description Language (NPDL) that typically binds messages of a contract to a single binding mechanism, a method of extending the Network Protocol Description Language by enabling individual messages of the contract to be bound to a plurality of different binding mechanisms, which allows messages of the contract to be sent across different binding mechanisms in order to exploit their unique characteristics, the method comprising acts of:

accessing a NPDL data structure that comprises a contract that outlines at least one message exchange pattern and at least one binding that comprises a plurality of binding mechanisms, each of which describe one or more of a specific data format or a specific transport to use in exchanging messages with a service;

exchanging between endpoints in a distributed system, a first and second message of the at least one message exchange pattern, the first message exchanged in accordance with a first binding mechanism from among the plurality of binding mechanisms and the second message exchanged in accordance with a second binding mechanism from among the plurality of binding mechanisms, the second binding mechanism being different from the first binding mechanism.

14. The method of claim 13, further comprising the acts of:

selecting a second binding mechanism from the plurality of binding mechanism, the second binding mechanism different from the first binding mechanism in describing how messages for the contract are to be exchanged with the service; and transferring a second message in accordance with the second binding.

15. The method of claim 14, wherein the second message is part of the at least one message exchange pattern.

16. The method of claim 14, wherein the first binding is a default binding.

17. The method of claim 14, wherein the first and second bindings are selected based on capabilities of the bindings.

18. The method of claim 14, wherein the first and second bindings are selected from the group comprising SOAP over UDP, SOAP over HTTP, SOAP over TCP/IP, SOAP over SMTP, SOAP over FTP, SOAP over SNA, SOAP over GPRS or SOAP SMS.

19. The method of claim 13, wherein the NPDL is WSDL and wherein the NPDL data structure is an XML document.

20. The method of claim 13, wherein the first binding mechanism corresponds to a plurality of other binding mechanisms that can be chosen based on one or more of system failures, efficiency purposes, resolving compatibility issues, or previous choices.

21. The method of claim 13, wherein addressing for the service is in terms of both a URL, which comprises strings for referencing the service across a specific transport of the distribute system, and a transport-neutral endpoint reference, which is a lightweight, extensible, self-contained description of the service.

22. One or more computer storage media, wherein computer storage media do not encompass signals, the one or more computer storage media having stored thereon a Network Protocol Description Language (NPDL) data structure, the Network Protocol Description Language data structure comprising:
 a contract field storing a plurality of contract values that describe at least one message exchange pattern for exchanging one or more messages with a service;
 a binding field comprising a plurality of binding mechanisms, each binding mechanism storing a different binding value that describes how the one or more messages are to be formatted and transported when being exchanged between the service and an endpoint of a distributed system in accordance with the message exchange pattern such that different binding mechanisms within the same binding may be selected for different messages of the at least one message exchange pattern define by the contract; and
 one or more service fields storing one or more address values that define at least one address for the service corresponding to one or more of the plurality of binding mechanisms.

23. The NPDL data structure of claim 22, wherein the one or more address values includes a URL address that reference the service over a specific transport on the distribute system, and wherein the one or more address values include a transport-neutral endpoint reference for the service that provides a lightweight, extensible, self-contained description of the service.

24. The NPDL data structure of claim 23, wherein the endpoint reference is in XML format and includes one or more of a UUID, phone number or a port address.

25. The NPDL data structure of claim 22, wherein the different binding values are selected from the group comprising SOAP over UDP, SOAP over HTTP, SOAP over TCP/IP, SOAP over SMTP, SOAP over FTP, SOAP over SNA, SOAP over GPRS or SOAP over SMS.

26. The NPDL data structure of claim 22, wherein one binding value for the plurality of binding mechanisms is a default binding.

27. The NPDL data structure of claim 22, wherein the NPDL data structure is a WSDL document.

28. At a computing device in a distributed system that utilizes a Network Protocol Description Language (NPDL) that typically binds messages of a contract to a single binding mechanism, a computer program product for implementing a method of extending the Network Protocol Description Language by enabling individual messages of the contract to be bound to a plurality of different binding mechanisms in order to exploit their unique characteristics, the computer program product comprising one or more computer storage media, wherein computer storage media do not encompass signals, the one or more computer storage media having stored thereon computer executable instructions that, when executed by a processor, cause the messaging system to perform the following:
 access a NPDL data structure that comprises a contract that outlines at least one message exchange pattern and at least one binding that comprises a plurality of binding mechanisms, each of which describe one or more of a specific data format or a specific transport to use in exchanging messages with a service;
 select a first binding mechanism from the plurality of binding mechanisms for exchanging a first message of the at least one message exchange pattern between endpoints within a distributed system, wherein one of the endpoints includes the service;
 transfer the first message to at least one of the endpoints in the distributed system in accordance with the first binding mechanism and the at least one message exchange pattern;
 select a second binding mechanism from the plurality of binding mechanisms for exchanging a second message of the at least one message exchange pattern between the endpoints, the second binding mechanism being different from the first binding mechanism; and
 transfer the second message to at least one of the endpoints in the distributed system in accordance with the second binding mechanism and the at least one message exchange pattern.

29. The computer program product of claim 28, further comprising computer executable instructions that, when executed by a processor, can cause the messaging system to perform the following:
 select a second binding mechanism from the plurality of binding mechanism, the second binding mechanism different from the first binding mechanism in describing how messages for the contract are to be exchanged with the service; and
 transfer a second message in accordance with the second binding.

30. The computer program product of claim 29, wherein the second message is part of the at least one message exchange pattern.

31. The computer program product of claim 29, wherein the first binding is a default binding.

32. The computer program product of claim 29, wherein the first and second bindings are selected based on capabilities of the bindings.

33. The computer program product of claim 29, wherein the first and second bindings are selected from the group comprising SOAP over UDP, SOAP over HTTP, SOAP over TCP/IP, SOAP over SMTP, SOAP over FTP, SOAP over SNA, SOAP over GPRS or SOAP SMS.

34. The computer program product of claim 28, wherein the NPDL is WSDL and wherein the NPDL data structure is an XML document.

35. The computer program product of claim 34, wherein the contract is defined by a portType element.

36. The computer program product of claim 35, wherein the portType element further comprises an operation element for the service.

37. The computer program product of claim 28, wherein the first binding mechanism corresponds to a plurality of other binding mechanisms that can be chosen based on one or more of system failures, efficiency purposes, resolving compatibility issues, or previous choices.

38. The computer program product of claim 28, wherein the first message is an input message to the service and includes addressing information for sending the second message to a client.

39. The computer program product of claim 28, wherein addressing for the service is in terms of both a URL, which comprises strings for referencing the service across a specific transport of the distribute system, and a transport-neutral endpoint reference, which is a lightweight, extensible, self-contained description of the service.

* * * * *